Figure 1:
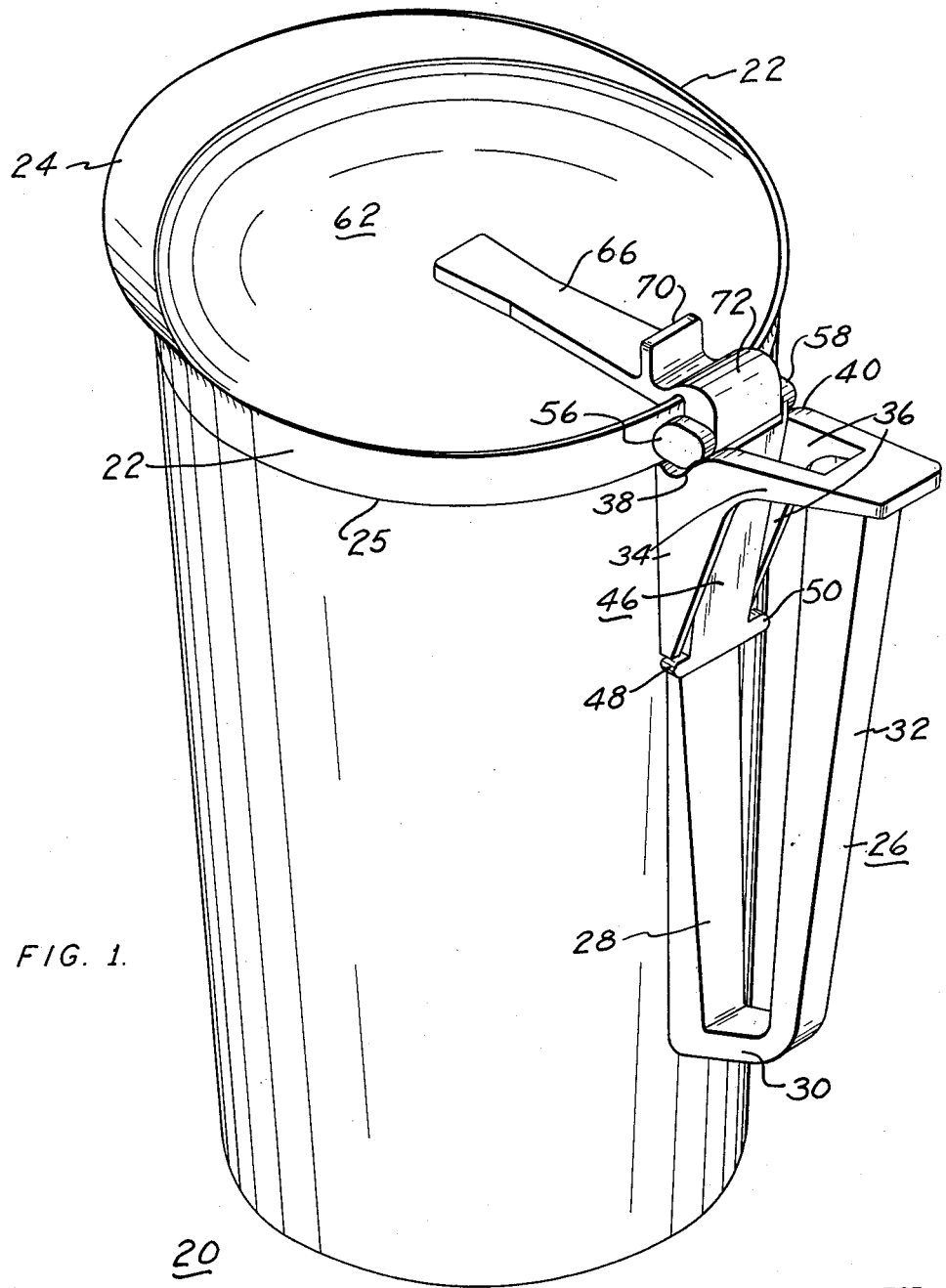

April 28, 1964   J. P. GITS   3,130,856
MOLDED ARTICLES AND METHODS OF MAKING SAME
Filed April 15, 1963   3 Sheets—Sheet 1

INVENTOR.
JULES P. GITS
BY Rey Eilers
ATTORNEY.

April 28, 1964 J. P. GITS 3,130,856
MOLDED ARTICLES AND METHODS OF MAKING SAME
Filed April 15, 1963 3 Sheets-Sheet 3
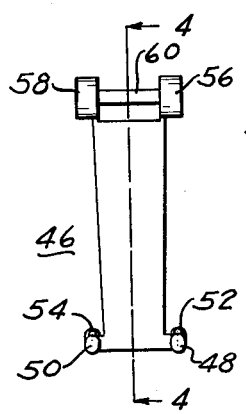
FIG. 3.
FIG. 4.
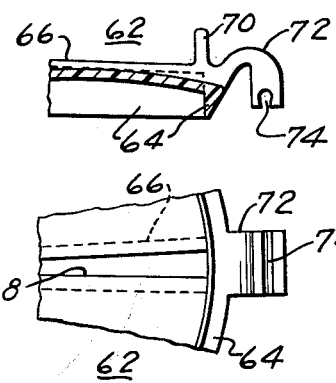
FIG. 5.
FIG. 6.
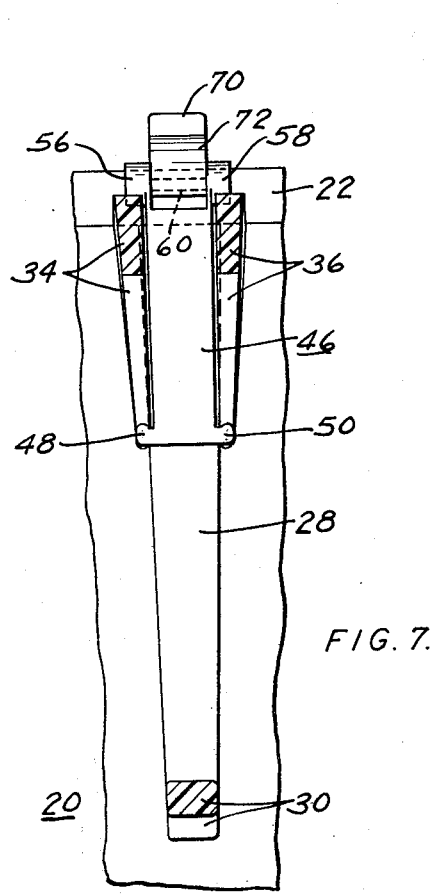
FIG. 7.
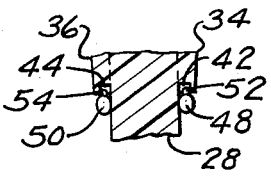
FIG. 8.
INVENTOR.
JULES P. GITS
BY Rey Eilers
ATTORNEY United States Patent Office 3,130,856
Patented Apr. 28, 1964

3,130,856
MOLDED ARTICLES AND METHODS OF
MAKING SAME
Jules Paul Gits, 1003 Lathrop Ave., River Forest, Ill.
Filed Apr. 15, 1963, Ser. No. 272,932
10 Claims. (Cl. 220—31)

This invention relates to improvements in molded articles and methods of making same. More particularly, this invention relates to improvements in molded open-top articles.

It is, therefore, an object of the present invention to provide an improved, molded, open-top article.

It is frequently desirable to enclose the contents of open-top articles; and, in recognition of that fact, many open-top articles have been equipped with closures. Yet, it is sometimes not particularly desirable to enclose the contents of open-top articles; and it is occasionally undesirable to have an open-top article encumbered by a closure. Consequently, it would be desirable to provide an open-top article which could, when desired, have the contents thereof enclosed by a closure, but which could, when desired, be freed of the encumberance of a closure. The present invention makes it possible for an open-top article to be closed by a closure when desired, and also makes it possible for that article to be freed of the encumbrance of a closure when desired; and it does so by providing that article with a removable closure and with a removable hinge for that closure. It is, therefore, an object of the present invention to provide an open-top article with a closure and with a removable hinge for that closure.

The removable hinge provided by the present invention is made so it fits the motif of the open-top article whenever it is assembled with that open-top article. This is desirable because it enables the combination of the open-top article and the removable hinge to be pleasing and attractive in appearance. Also, that removable hinge is made so the open-top article can have a pleasing appearance even after that removable hinge has been separated from that open-top article. All of this means that the open-top article of the present invention can have an attractive and pleasing appearance whether the removable hinge is assembled with or is separated from that open-top article.

The closure provided by the present invention is made so it fits the motif of the open-top article whenever it is assembled with that open-top article. This is desirable because it enables the combination of the open-top article and the closure to be pleasing and attractive in appearance. Also, that closure is made so the open-top article can have a pleasing appearance even after that closure has been separated from that open-top article. All of this means that the open-top article of the present invention can have an attractive and pleasing appearance whether the closure is assembled with or is separated from that open-top article.

The removable hinge for the closure for the open-top article of the present invention is made so it can be associated with the handle of that open-top article. Whenever that hinge is associated with the handle of that open-top article, it will tend to complement and to merge into that handle. As a result, that hinge tends to appear to be a natural and appropriate part of the motif of that handle and of that open-top article. It is, therefore, an object of the present invention to provide a removable hinge for the closure for an open-top article which tends to complement and to merge into the handle of that open-top article.

The removable hinge and the handle of the open-top article of the present invention are formed so the hinge is stressed whenever it is assembled with that handle. This is desirable, because it enables the restorative forces within that hinge to hold that hinge in assembled relation with that handle. As a result, accidental separation of that hinge from that handle is prevented. It is, therefore, an object of the present invention to form a removable hinge and the fixed handle of an open-top article so that hinge will be stressed whenever it is assembled with that handle.

Other and further objects and advantages of the present invention should become apparent from an examination of the drawing and accompanying description.

In the drawing and accompanying description, a preferred embodiment of the present invention is shown and described, but it is to be understood that the drawing and accompanying description are for the purpose of illustration only and do not limit the invention and that the invention will be defined by the appended claims.

Figure 2:
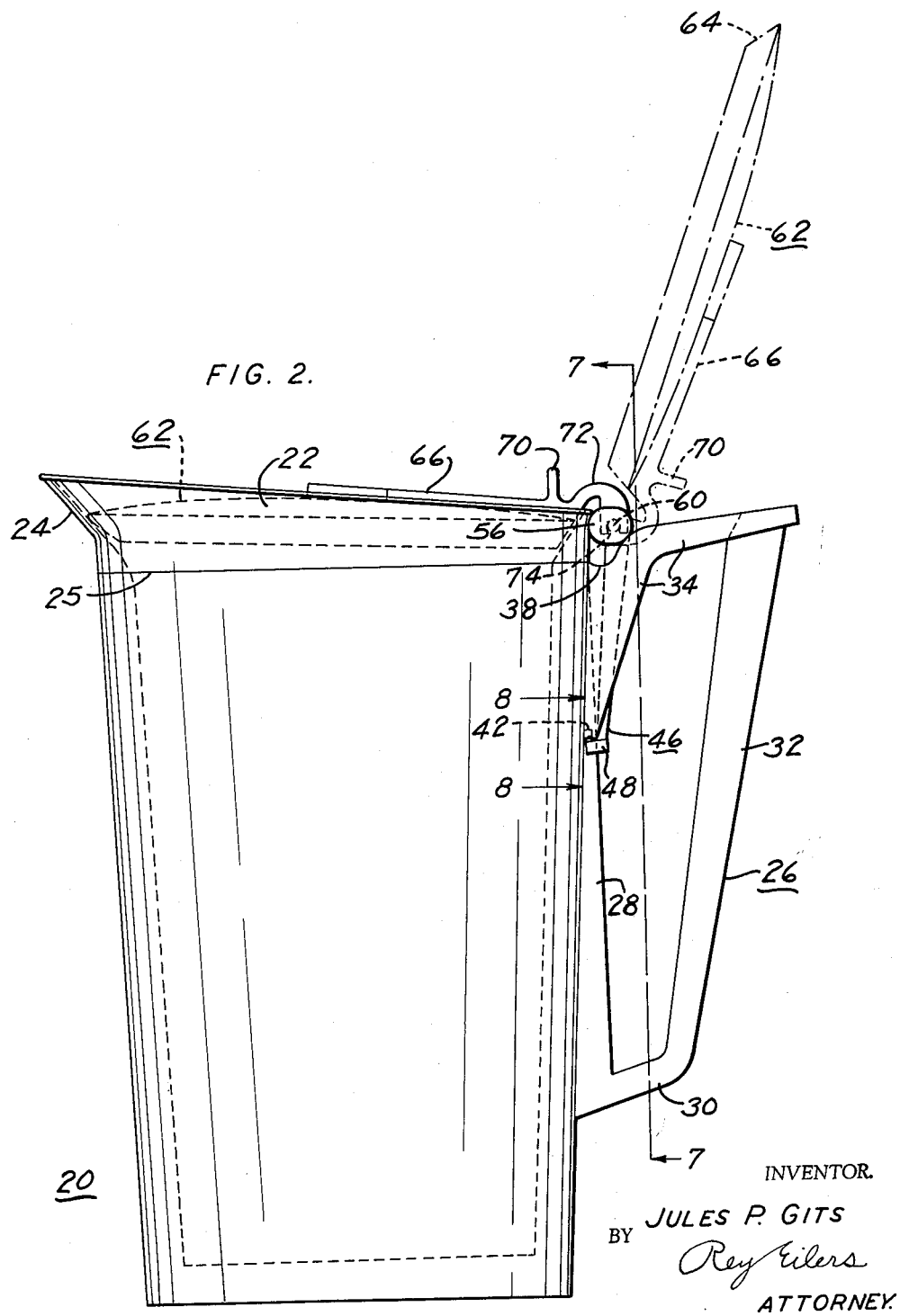

In the drawing, FIG. 1 is a perspective view of an open-top pitcher with a closure and a removable hinge assembled with it, FIG. 2 is a side elevational view of the open-top pitcher, closure, and removable hinge of FIG. 1, and it shows the open and closed positions of that closure by dotted lines, FIG. 3 is an elevational view of one of the hinge plates of the removable hinge of FIGS. 1 and 2, FIG. 4 is a sectional view through the hinge plate of FIG. 3, and it is taken along the plane indicated by the line 4—4 in FIG. 3, FIG. 5 is a vertical section through part of the closure of FIGS. 1 and 2, FIG. 6 is a bottom view of the portion of the closure shown in FIG. 5, FIG. 7 is a sectional view through the handle of the pitcher of FIGS. 1 and 2, and it is taken along the plane indicated by the line 7—7 in FIG. 2, and FIG. 8 is a sectional view through the lower part of the handle of the pitcher of FIGS. 1 and 2, and it is taken along the plane indicated by the line 8—8 in FIG. 2.

Referring to the drawing in detail, the numeral 20 generally denotes one form of pitcher that is made in accordance with the principles and teachings of the present invention. The body of that pitcher is frusto-conical in elevation, and it has its smallest diameter at the bottom thereof. The pitcher 20 is provided with a bell-like upper portion 22; and a pouring lip 24 is formed adjacent the forward end of that bell-like upper portion. The pitcher 20 is preferably made as an outer shell and an inner shell, and those two shells abut each other at a horizontally-directed joint 25. However, the form and construction of the body portion of the pitcher 20 is not significant; and the present invention could be embodied in other types of pitchers and could also be embodied in steins and other open-top articles.

The numeral 26 generally denotes the handle for the pitcher 20; and that handle includes a portion 28 which abuts one side of the body portion of that pitcher, includes a bottom portion 30 includes a finger-receiving portion 32, and includes two arms 34 and 36 that substantially define the upper end of that handle. The portion 28 is generally vertically-directed, but it is thicker at the bottom thereof than it is at the top thereof. As a result, that portion is tapered; and, in the form of pitcher shown by the drawing, the taper of the portion 28 is greater than the taper of the body portion of the pitcher. The bottom 30 inclines outwardly and somewhat upwardly from the side of the body portion of the pitcher 20; and the finger-receiving portion 32 extends upwardly from the bottom 30 and diverges slightly from the said side of the body portion of the pitcher. The arms 34 and 36 have portions which abut the said side of the pitcher 20, and also have portions which are generally parallel to the bottom 30. The arms 34 and 36 are, throughout the greatest parts of their lengths, spaced apart a distance approximately equal to the thickness of the finger-receiving portion 32; but the outer ends of those arms are connected together and to the upper end of the finger-receiving portion 32. A recess 38 is formed in the upper edge of the arm 34 adjacent the body portion of the pitcher 20, and a similar recess 40 is formed in the upper edge of the arm 36 adjacent that body portion. As indicated particularly by FIG. 2, the recess 38 has a concave portion immediately adjacent the body portion of the pitcher 20, and then has a convex portion which merges into the upper edge of the arm 34. The recess 40 has a similar configuration. A small recess 42 is formed in the arm 34 adjacent the bottom of that arm; and that recess is immediately adjacent the body portion of the pitcher 20. A similar recess 44 is provided in the lower end of the arm 36. The recesses 42 and 44 are in the nature of shallow sockets which extend upwardly from the bottom faces of the arms 34 and 36.

The numeral 46 generally denotes one of the hinge plates of a removable hinge for the pitcher 20. That hinge plate is elongated, and it is vertically-directed whenever it is assembled with the pitcher 20. That hinge plate has ears 48 and 50 which project outwardly and which extend rearwardly from the lower end of that hinge plate. Those ears are spaced apart a distance which corresponds with the spacing between the opposite sides of the portion 28 of the handle 26. Further, those ears are long enough to enable the rear ends thereof to be immediately adjacent the outer surface of the body portion of the pitcher 20 whenever the hinge plate 46 is assembled with that body portion. Abutments 52 and 54 are provided, respectively, on the upper faces of the ears 48 and 50; and those abutments extend upwardly from those ears. The abutment 52 is dimensioned to extend into the recess 42 and the abutment 54 is dimensioned to extend into the recess 44, as shown particularly by FIG. 8.

The hinge plate 46 has ears 56 and 58 adjacent the upper end thereof; and those ears are ovate in elevation, as shown particularly by FIGS. 1 and 2. Those ears extend upwardly from the upper end of the hinge plate 46, and they also project laterally outwardly beyond the sides of that hinge plate. A pivot 60 of circular cross section extends between the ears 56 and 58 on the hinge plate 46. The ears 56 and 58 are dimensioned so the rear faces of those ears can abut the bell-like upper portion 22 of the pitcher while the front faces of those ears can, in part, abut the convex portions of the recesses 38 and 40 of the ears 34 and 36, as shown particularly by FIGS. 1 and 2.

The hinge plate 46 is dimensioned so the unstressed distance between the ears 48 and 56 is less than the distance between the bottom and the top of the arm 34; and, similarly, the unstressed distance between the ears 50 and 58 is less than the distance between the bottom and the top of the arm 36. As a result, the ears 48 and 50 must be bent downwardly to enable those ears to underlie the lower ends of the arms 34 and 36 when the ears 56 and 58 are lodged within the recesses 38 and 40 of those arms. As the ears 48 and 50 are moved into position beneath the lower ends of the arms 34 and 36, the abutments 52 and 54 on those ears will be introduced into the recesses 42 and 44 in those ears. Those abutments will then coact with the recesses 42 and 44, while the ears 56 and 58 coact with the recesses 38 and 40, to releasably hold the hinge plate 46 in assembled relation with the handle 26. However, whenever it is desirable to separate the hinge plate 46 from the handle 26, it is only necessary to bend the ears 48 and 50 downwardly to free the abutments 52 and 54 from the recesses 42 and 44, and then to move the lower end of the hinge plate 46 outwardly and away from the lower ends of the arms 34 and 36.

The numeral 62 generally denotes the closure for the pitcher 20; and that closure is circular in plan. A frusto-conical, downwardly-depending, shallow flange 64 is provided on the closure 62; and that flange is intended to fit snugly within the bell-like upper end 22 of the pitcher 20. A hinge plate 66 is secured to the closure 62; and, in the particular embodiment shown, that hinge plate is formed integrally with that closure. An elongated recess 68 is formed in the under face of the closure 62 at the time that closure and the hinge plate 66 thereon are formed. A finger-receiving abutment 70 extends upwardly from the hinge plate 66; and that abutment is close to the periphery of the closure 62. The outer end of the hinge plate 66 is formed as a gooseneck 72; and that gooseneck curves upwardly and then downwardly, as shown particularly by FIG. 5. An elongated slot 74 is formed in the bottom face of that gooseneck; and that slot has an arcuate extent in excess of two hundred and seventy degrees. The hinge plate 66 and the gooseneck 72 thereof are formed of a material, as for example a thermoplastic material, which can be bent slightly without cracking or breaking. As a result, the portions of the gooseneck 72 which define the slot 74 can be spread apart to enable that slot to telescope downwardly over the pivot 60 which is a part of the hinge plate 46. The resistance of the slot-defining portions of the gooseneck 72 to bending will be great enough so those portions will be able to resist accidental separation of the hinge plate 66 and the closure 62 from the hinge plate 46.

As indicated particularly by FIGS. 1 and 2, the arms 34 and 36 largely conceal the hinge plate 46 when the handle 26 is viewed from the side. The finger-receiving portion 32 of the handle 26 will largely conceal that hinge plate when the pitcher 20 is set so the handle 26 is directly in front of the viewer. Also, as shown particularly by FIG. 2, the closure 62 is largely concealed and out of view when it is in closed position. As a result, the removable hinge and the closure for the pitcher 20 do not adversely affect the ornamental and attractive appearance of that pitcher.

To assemble the closure 62 and the hinge therefor with the pitcher 20, the hinge plate 46 will be turned so it lies in a plane which is parallel to the arms 34 and 36 and so it is disposed between those arms. That hinge plate can then be lowered downwardly until the ears 56 and 58 thereon are immediately adjacent the upper ends of the arms 34 and 36. Thereupon, that hinge plate will be rotated ninety degrees about a vertical axis so it will lie in a plane which is generally parallel to the finger-receiving portion 32 of the handle 26. The ears 56 and 58 will then be moved forwardly along the upper surfaces of the arms 34 and 36 until those ears abut the bell-like upper portion 22 of the pitcher 20. Thereafter, the lower end of the hinge plate 46 will be moved toward the side of the body portion of the pitcher 20, and the abutments 52 and 54 will be forced under the lower ends of the arms 34 and 36. The upper ends of the abutments 52 and 54 are generally spherical in configuration, and hence they will coact with the lower ends of the arms 34 and 36 to cause the ears 48 and 54 to bend downwardly far enough to enable those abutments to pass under the lower ends of the arms 34 and 36 and to move into register with the recesses 42 and 44 in those lower ends. Thereafter, the ears 48 and 50 will tend to return to their normal unstressed positions, and they will thereby apply a holding force to the handle 26. That holding force will be sufficient to prevent accidental separation of the closure 62 and the hinge therefor from the pitcher 20.

It will be noted that the ears 56 and 58 are wedged into the recesses 38 and 40 in the upper ends of the arms 34 and 36 and that those ears can not be freed from the handle 26 unless and until the lower end of the hinge plate 46 is moved outwardly and away from the side of the body portion of the pitcher 20. This is important because the forces which are applied to the closure 62 will not tend to, and will not be able to, cause the lower end of the hinge plate 46 to move away from the body portion of the pitcher 20. This is also important because it means that the portion of the hinge plate 46 that will normally receive the largest forces, namely, the ears 56 and 58, will be locked against separation from the body portion of the pitcher 20 until the portion of that hinge plate that will normally receive the smallest forces, namely, the ears 48 and 50, is released from the handle 26. Further, because the ears 48 and 50 are remote from the point where the principal applications of force to the hinge plate 46 will be made, the removable hinge is easily able to withstand any forces which tend to separate it from the pitcher 20 and from the handle 26.

It will be noted that the hinge plate 46 is wholly and completely spaced away from the interior of the pitcher 20. This is very desirable because it enables the interior of that pitcher to be free of any crevices or recesses in which bacteria could lodge and grow.

Whereas the drawing and accompanying description have shown and described a preferred embodiment of the present invention it should be apparent to those skilled in the art that various changes may be made in the form of the invention without affecting the scope thereof.

What I claim is:

1. A pitcher that has:
   (a) a body portion,
   (b) an arm extending generally radially outwardly from said body portion,
   (c) a second arm extending generally radially outwardly from said body portion,
   (d) said arms being, in part, spaced apart circumferentially of said body portion,
   (e) said arms having concave-convex recesses in the upper surfaces thereof,
   (f) said arms having generally vertically-directed recesses in the bottom surfaces thereof,
   (g) said arms forming part of a handle for said pitcher,
   (h) a closure for said pitcher, and
   (i) a hinge for said closure,
   (j) said hinge having a hinge plate that is disposable, in part, between said arms, whereby part of said hinge plate will be overlain by said arms,
   (k) said hinge plate having tangentially-extending ears that are disposable, in part, within said concavo-convex recesses in said upper surfaces of said arms,
   (l) said hinge plate having further, tangentially-extending ears that are adapted to underlie said recesses in the bottom surfaces of said arms,
   (m) the first said tangentially-extending ears being adjacent the top of said hinge plate,
   (n) said further, tangentially-extending ears being adjacent the bottom of said hinge plate,
   (o) said further, tangentially-extending ears having abutments thereon which are engageable with said recesses in the bottom surfaces of said arms to releasably secure the bottom of said hinge plate to said arms,
   (p) the unstressed distances between the first said tangentially-extending ears and said further, tangentially-extending ears being less than the distances between said concavo-convex recesses in the upper surfaces of said arms and said recesses in the bottom surfaces of said arms whereby said hinge plate must be stressed whenever the first said tangentially-extending ears are disposed in said concavo-convex recesses in the upper surfaces of said arms and said abutments on said further, tangentially-extending ears are in engagement with said recesses in the bottom surfaces of said arms,
   (q) said closure being disposable within the open top of said pitcher to substantially close said open top,
   (r) said closure being substantially hidden from view whenever it is disposed within the open top of said pitcher,
   (s) said hinge having a second hinge plate that rotatably secures said closure to the first said hinge plate and thus to said pitcher,
   (t) said second hinge plate having a gooseneck therein to enable said closure to be disposed within the open top of said pitcher,
   (u) said hinge and said closure being securable to and separable from said pitcher as a unit,
   (v) the first said tangentially-extending ears tending to appear to merge with the top surfaces of said arms,
   (w) said further, tangentially-extending ears tending to appear to merge with the bottom surfaces of said arms,
   (x) said concavo-convex recesses and the first said tangentially-extending ears normally receiving any forces which would tend to separate the first said hinge plate from said arms,
   (y) said further, tangentially-extending ears being displaced from the forces which normally tend to separate the first said hinge plate from said arms,
   (z) the first said hinge plate and the said ears thereon being disposed wholly exteriorly of the interior of said pitcher,
   (aa) the first said hinge plate being disposable between said arms and being disposable so it is generally radially-directed of said body portion to permit said hinge plate to be moved downwardly until the first said tangentially-extending ears are adjacent said upper surfaces of said arms,
   (ab) the first said hinge plate thereafter being rotatable until it is generally tangentially-directed of said body portion to permit the first said tangentially-extending ears to be moved into said concavo-convex recesses in said upper surfaces of said arms,
   (ac) said abutments on said further, tangentially-extending ears then being movable into engagement with said recesses in the bottom surfaces of said arms.

2. A pitcher that has:
   (a) a body portion,
   (b) an arm extending generally radially outwardly from said body portion,
   (c) a second arm extending generally radially outwardly from said body portion,
   (d) said arms being, in part, spaced apart circumferentially of said body portion,
   (e) said arms having concavo-convex recesses in the upper surfaces thereof,
   (f) said arms having generally vertically-directed recesses in the bottom surfaces thereof,
   (g) said arms forming part of a handle for said pitcher,
   (h) a closure for said pitchers, and
   (i) a hinge for said closure,
   (j) said hinge having a hinge plate that is disposable, in part, between said arms, whereby part of said hinge plate will be overlain by said arms,
   (k) said hinge plate having tangentially-extending ears that are disposable, in part, within said concavo-convex recesses in said upper surfaces of said arms,
   (l) said hinge plate having further, tangentially-extending ears that are adapted to underlie said recesses in the bottom surfaces of said arms,
   (m) the first said tangentially-extending ears being adjacent the top of said hinge plate,
   (n) said further, tangentially-extending ears being adjacent the bottom of said hinge plate,
   (o) said further, tangentially-extending ears having abutments thereon which are engageable with said recesses in the bottom surfaces of said arms to releasably secure the bottom of said hinge plate to said arms,
   (p) the unstressed distances between the first said tangentially-extending ears and said further, tangentially-extending ears being less than the distances between said concavo-convex recesses in the upper surfaces of said arms and said recesses in the bottom surfaces of said arms, whereby said hinge plate must be stressed whenever the first said tangentially-extending ears are disposed in said concavo-convex recesses in the upper surfaces of said arms and said abutments on said further, tangentially-extending ears are in engagement with said recesses in the bottom surfaces of said arms, (q) said closure being disposable within the open top of said pitcher to substantially close said open top, (r) said closure being substantially hidden from view whenever it is disposed within the open top of said pitcher, (s) said hinge having a second hinge plate that rotatably secures said closure to the first said hinge plate and thus to said pitcher, (t) said second hinge plate having a gooseneck therein to enable said closure to be disposed within the open top of said pitcher, (u) said hinge and said closure being securable to and separable from said pitcher as a unit, (v) the first said tangentially-extending ears tending to appear to merge with the top surfaces of said arms, (w) said further, tangentially-extending ears tending to appear to merge with the bottom surfaces of said arms.

(x) said concavo-convex recesses and the first said tangentially-extending ears normally receiving any forces which would tend to separate the first said hinge plate from said arms, (y) said further, tangentially-extending ears being displaced from the forces which normally tend to separate the first said hinge plate from said arms, (z) the first said hinge plate and the said ears thereon being disposed wholly exteriorly of the interior of said pitcher.

3. An open-top article that has:
(a) a body portion,
(b) an arm extending outwardly from said body portion,
(c) a second arm extending outwardly from said body portion,
(d) said arms being, in part, spaced apart circumferentially of said body portion,
(e) said arms having recesses in the upper surfaces thereof,
(f) said arms having generally vertically-directed recesses in the bottom surfaces thereof,
(g) said arms forming part of a handle for said open-top article,
(h) a closure for said open-top article, and
(i) a hinge for said closure,
(j) said hinge having a hinge plate that is disposable, in part, between said arms, whereby part of said hinge plate will be overlain by said arms,
(k) said hinge plate having ears that are disposable, in part, within said recesses in said upper surfaces of said arms,
(l) said hinge plate having further ears that are adapted to underlie said recesses in the bottom surfaces of said arms,
(m) the first said ears being adjacent the top of said hinge plate,
(n) said further ears being adjacent the bottom of said hinge plate,
(o) said further ears having abutments thereon which are enageable with said recesses in the bottom surfaces of said arms to releasably secure the bottom of said hinge plate to said arms,
(p) the unstressed distances between the first said ears and said further ears being less than the distances between said recesses in the upper surfaces of said arms and said recesses in the bottom surfaces of said arms, whereby said hinge plate must be stressed whenever the first said ears are disposed in said recesses in the upper surfaces of said arms and said abutments on said further ears are in engagement with said recesses in the bottom surfaces of said arms, (q) said closure being disposable within the open top of said open-top article to substantially close said open top, (r) said closure being substantially hidden from view whenever it is disposed within the open top of said open-top article, (s) said hinge having a second hinge plate that rotatably secures said closure to the first said hinge plate and thus to said open-top article, (t) said second hinge plate having a gooseneck therein to enable said closure to be disposed within the open top of said open-top article, (u) said hinge and said closure being securable to and separable from said open-top article as a unit.

4. An open-top article that has:
(a) a body portion,
(b) an arm extending outwardly from said body portion,
(c) a second arm extending outwardly from said body portion,
(d) said arms being, in part, spaced apart circumferentially of said body portion,
(e) said arms forming part of a handle for said open-top article,
(f) a closure for said open-top article, and
(g) a hinge for said closure,
(h) said hinge having a hinge plate that is disposable, in part, between said arms,
(i) said hinge plate having ears that can releasably engage the upper surfaces of said arms,
(j) said hinge plate having further ears that can selectively engage the lower surfaces of said arms,
(k) the first said ears being adjacent the top of said hinge plate,
(l) said further ears being adjacent the bottom of said hinge plate,
(m) the unstressed distances between the first said ears and said further ears being less than the distances between siad upper and lower surfaces of said arms, whereby said hinge plate must be stressed whenever the first said ears engage said upper surfaces of said arms and said further ears engage said lower surfaces of said arms,
(n) said closure being disposable within the open top of said open-top article to substantially close said open top,
(o) said hinge having a second hinge plate that rotatably secures said closure to the first said hinge plate and thus to said open-top article,
(p) said hinge and said closure being securable to and separable from said open-top article as a unit,
(q) the first said ears and said further ears on the first said hinge plate coacting with portions of said upper and lower surfaces of said arms to prevent accidental separation of said hinge and closure from said open-top article.

5. An open-top article that has:
(a) a body portion,
(b) an arm extending outwardly from said body portion,
(c) a second arm extending outwardly from said body portion,
(d) said arms being, in part, spaced apart circumferentially of said body portion,
(e) said arms forming part of a handle for said open-top article,
(f) a closure for said open-top article, and
(g) a hinge for said closure,
(h) said hinge having a hinge plate that is disposable, in part, between said arms, (i) said hinge plate having ears that can releasably engage the upper surfaces of said arms, (j) said hinge plate having further ears that can selectively engage the lower surfaces of said arms, (k) the first said ears being adjacent the top of said hinge plate, (l) said further ears being adjacent the bottom of said hinge plate, (m) the unstressed distances between the first said ears and said further ears being less than the distances between said upper and lower surfaces of said arms, whereby said hinge plate must be stressed whenever the first said ears engage said upper surfaces of said arms and said further ears engage said lower surfaces of said arms, (n) the first said ears and said further ears on the said hinge plate coacting with portions of said upper and lower surfaces of said arms to prevent accidental separation of said hinge and closure from said open-top article.

6. An open-top article that has:

(a) a body portion, (b) an arm extending outwardly from said body portion, (c) a second arm extending outwardly from said body portion, (d) said arms being, in part, spaced apart circumferentially of said body portion, (e) said arms having recesses in the upper surfaces thereof, (f) said arms having recesses in the bottom surfaces thereof, (g) said arms forming part of a handle for said open-top article, (h) a closure for said open-top article, and (i) a hinge for said closure, (j) said hinge having a hinge plate that is disposable, in part, between said arms, (k) said hinge plate having ears that are disposable, in part, within said recesses in said upper surfaces of said arms, (l) said hinge plate having portions that are adapted to engage said recesses in the bottom surfaces of said arms, (m) said ears being adjacent the top of said hinge plate, (n) said portions of said hinge plate being adjacent the bottom of said hinge plate, (o) the unstressed distances between said ears and said portions of said hinge plate being less than the distances between said recesses in said upper surfaces and in said bottom surfaces of said arms, whereby said hinge plate must be stressed whenever said ears engage said recesses in said upper surfaces of said arms and said portions of said hinge plate engage said recesses in said bottom surfaces of said arms.

7. An open-top article that has:

(a) a body portion, (b) a handle, (c) a closure for said open-top article, and (d) a hinge for said closure, (e) said handle having concavo-convex recesses therein, (f) said handle having further recesses therein, (g) said hinge having a hinge plate that is selectively securable to said handle, (h) said hinge plate having securing portions that are selectively engageable with said concavo-convex recesses, (i) said hinge plate having further securing portions that are selectively engageable with said further recesses, (j) said further securing portions having to be separated from said further recesses before the first said securing portions can be separated from said concavo-convex recesses, (k) said further securing portions being remote from the forces that normally tend to separate said hinge plate from said handle.

8. An open-top article that has:

(a) a body portion, (b) a handle, (c) a closure for said open-top article, and (d) a hinge for said closure, (e) said handle having recesses therein, (f) said handle having further recesses therein, (g) said hinge having a hinge plate that is selectively securable to said handle, (h) said hinge plate having securing portions that are selectively engageable with the first said recesses, (i) said hinge plate having further securing portions that are selectively engageable with said further recesses, (j) the unstressed distances between the first said and said further securing portions being less than the distances between the first said and said further recesses, whereby said hinge plate must be stressed whenever said securing portions engage said recesses, (k) said hinge plate being disposed wholly exteriorly of the interior of said open-top article.

9. An open-top article that has:

(a) a body portion, (b) a closure for said open-top article, and (c) a hinge for said closure, (d) said open-top article having recesses therein, (e) said open-top article having further recesses therein, (f) said hinge having a hinge plate that is selectively securable to said open-top article, (g) said hinge plate having securing portions that are selectively engageable with the first said recesses, (h) said hinge plate having further securing portions that are selectively engageable with said further recesses, (i) said further securing portions having to be separated from said further recesses before the first said securing portions can be separated from the first said recesses, (j) said hinge plate being disposed wholly exteriorly of the interior of said open-top article.

10. A removable hinge for an open-top article that comprises:

(a) a hinge plate, (b) ears that project outwardly adjacent the upper end of said hinge plate to seat within recesses in said open-top article, and (c) further ears adjacent the lower end of said hinge plate to engage portions of said open-top article, (d) the first said ears lodging within said recesses in said open-top article and strongly resisting accidental dislodging forces, (e) said further ears being selectively separable from said portions of said open-top article to enable the first said ear to be move out of said recesses but being spaced from the first said ears, whereby forces applied to the first said ears have but little effect upon said further ears, (f) said hinge plate being dimensioned so it is stressed whenever the first said ears are disposed within said recesses and said further ears are in engagement with said portions of said open-top article.

References Cited in the file of this patent
UNITED STATES PATENTS

| | | |
|---|---|---|
| 2,960,254 | Kiba | Nov. 15, 1960 |
| 3,045,860 | Harvey | July 24, 1962 |